United States Patent [19]

Carson et al.

[11] Patent Number: 4,886,303
[45] Date of Patent: Dec. 12, 1989

[54] COUPLING WITH IMPROVED ELASTOMERIC FACE SEAL

[75] Inventors: Forrest L. Carson; Kenneth M. Johnson, both of Borger, Tex.

[73] Assignee: J. M. Huber Corporation, Rumson, N.J.

[21] Appl. No.: 217,203

[22] Filed: Jul. 11, 1988

[51] Int. Cl.⁴ ............................................. F16L 17/03
[52] U.S. Cl. ................................... 285/99; 285/352; 285/379
[58] Field of Search ................. 285/99, 108, 349, 350, 285/352, 379; 277/27, 165, 167.5

[56] References Cited

U.S. PATENT DOCUMENTS

| | | | |
|---|---|---|---|
| 489,107 | 1/1893 | Storz | 285/352 X |
| 1,738,484 | 12/1929 | Robinson | 285/99 X |
| 1,985,349 | 12/1934 | Kelly | 285/99 X |
| 2,250,199 | 7/1941 | Kelly | 285/99 |
| 2,565,923 | 8/1951 | Hrdlicka | 285/108 X |
| 3,442,515 | 5/1969 | Murauskas | 277/165 |
| 3,498,641 | 3/1970 | Bohlen | 285/352 X |
| 3,758,137 | 9/1973 | Kershaw | 285/352 X |
| 4,155,557 | 5/1979 | Grebert | 277/165 X |
| 4,643,459 | 2/1988 | Carson | |

FOREIGN PATENT DOCUMENTS 2207997 9/1973 Fed. Rep. of Germany ........ 285/99
798470 7/1958 United Kingdom ................ 285/352

OTHER PUBLICATIONS

Parker Seal Catalog, Parker Seal Group, 1986, inside cover and p. 1.
Bar-Way Product Lit., Bar-Way Manufacturing.
Banjo Product Lit., Terra-Products, Inc.
Sketches by Reel, 7-1-88.

*Primary Examiner*—David A. Scherbel
*Assistant Examiner*—Jerrold D. Johnson
*Attorney, Agent, or Firm*—Harold H. Flanders; Alec H. Horn; Robert L. Price

[57] ABSTRACT

A quick-connect coupling is disclosed for manually joining together pipe or hose sections or the like. A pair of identical coupling bodies are provided, each containing an elastomeric annular face seal, and adapted for sealing engagement with a corresponding coupling body. Members are provided for releasably joining the coupling bodies together. The coupling forms a fluid-tight seal with its mate under low pressure conditions, yet when the coupling is over-pressured, it does not fail catastrophically.

8 Claims, 1 Drawing Sheet

COUPLING WITH IMPROVED ELASTOMERIC FACE SEAL

FIELD OF THE INVENTION

This invention relates to fluid-tight couplings of the type adapted for quick manual connection and disconnection and, more particularly, to a coupling with improved elastomeric face seals in one coupling half for sealing engagement with a corresponding face seal in the other coupling half.

BACKGROUND OF THE INVENTION

Couplings have long been used for releasably interconnecting sections of tubular goods, such as industrial or fire hose, in fluid-tight engagement. Popular techniques for releasably connecting the faces of coupling bodies include cam action locking levers and variations of familiar male/female threaded joint couplings. Typically, these coupling bodies have compression seals with radially planar sealing surfaces.

One disadvantage of these couplings is the difficulty often experienced in manually making up these couplings for fluid-tight engagement. This difficulty is commonly the result of the significant amount of axial force required to establish both a fluid-tight seal under low fluid pressure while simultaneously having a seal which can withstand higher fluid pressure.

Another disadvantage of many prior art couplings is the use of coupling bodies with separate male and female components, whereby only hose sections with an opposite coupling can be joined. In fire emergency situations, long sections of hose having a coupling half attached to each end, are often hurriedly laid out to form a hose network to be connected later. If a hose section end is not properly adjacent another appropriately mated hose section end, precious time is wasted in rearranging sections until a matching coupling is found.

In the case of threaded couplings, another disadvantage is that multiple rotations are often necessary to securely join the coupling thereby increasing the effort and time required. These exposed threads are often subject to damage by foreign substances clogging the threads, metal fatigue, cross-threading and other damage in the dilaterious environment of fire scenes and industrial or oilfield applications.

For these and other reasons manually tightened couplings of a "quick-connect" variety were developed in the art which could establish a fluid-tight seal between two radially planar sealing surfaces by means of a partial relative rotation of the couplings along a common longitudinal axis. Although various techniques are known to releasably connect the faces of coupling bodies, a particularly desirable design is disclosed in commonly assigned U.S. Pat. No. 4,643,459 to Carson. However, problems have been associated with such couplings of the quick-connect design.

For example, a manual coupling using the "Storz" type seal has an annular groove set in a radially planar sealing end of each coupling body. An elastomeric seal having a rounded protrusion at its base is forced into the groove and held in place by a hook which fits over the protrusion.

Although in usual operation this forms an adequate sealing mechanism, this sealing technique is not without its shortcomings. Under very high pressures, this seal of the prior art tends to fold back upon itself until the seal is so distorted as to free itself from the retaining hook and, under extreme conditions, completely extrude between the coupling bodies.

When the pressure inside the coupling is reduced, the seal cannot return to its original location beneath the retaining hook and the seal remains broken. In extreme cases the seal body will remain wedged between the faces of the coupling and the locking mechanism may not be released without excessive force.

A coupling which uses the Storz seal technique is expensive to manufacture due to the intricate notch and groove arrangement of the sealing groove. Further, the Storz type seal is very difficult to install and remove without damaging the seal or taking an inordinate amount of time, particularly in the larger dimensions. In addition, these Storz type seals are unacceptable for food grade service because of the difficulty in removing and cleaning the seal and the inaccessible, hard to clean recesses caused by the hook and groove arrangement which provide sites for bacterial growth.

Another significant problem with a coupling having the Storz type seal is catastrophic failure in response to a pressure surge. If a coupling is pressured beyond its rated capacity (typical of the situation where a vehicle runs over the hose), the seal unseats itself from the retaining groove and begins to extrude through the space between the planar sealing surfaces of the coupling. Because of the nature of the seal and retaining hooks, the seal cannot reseat itself even after the pressure is reduced. Accordingly, the coupling will thereafter continue to leak with pressurized fluid spraying from the coupling. This failure mode, termed "catastrophic failure", makes couplings using the Storz type seals unsatisfactory for the transport of many liquids.

More exotic face seals are available which contain dual material, elastomeric seals which perform well in many applications. However, these dual material seals are expensive and require too much radial force on the coupling to energize the elastomer-to-elastomer seal for manual, quick-connect couplings.

These and other disadvantages are overcome by the invention hereinafter described wherein a novel coupling is disclosed.

SUMMARY OF THE INVENTION

In a preferred embodiment of the present invention, a quick-connect, manual coupling is provided for fluid-tight mating of coupling bodies attached to hose sections or the like. A pair of identical coupling bodies are provided, each containing an elastomeric annular seal housed in a sealing end of each coupling body for sealing engagement with a corresponding coupling body and seal when the couplings are mated together.

Each coupling body has an annular recess for receiving the seal. This annular recess is defined by a base and an outer wall, and has an open end. An annular securing member extends radially inward from the outer wall to place the seal in constant radial compression and, simultaneously, act to secure the seal within the annular recess. The seal is configured to fit within the annular recess partially below the annular securing member and thereby be further secured in place.

In cross section, the annular seal has a tapered upper surface projecting radially inward and axially away from its respective coupling body at an angle from 13° to 17° for sealing engagement with the tapered upper surface of the seal of the corresponding coupling body. Further, the seal has a radially inward concave surface with a selected radius of curvature with the center positioned axially adjacent the center of the annular seal. A radially outward projection near the base of the annular recess provides a surface for the annular securing member to engage.

It is an object of the present invention to provide a coupling with a radially planar face seal in each body adapted to mate with a corresponding coupling body to form an elastomer-to-elastomer seal when the coupling bodies are mated.

It is another object of the present invention to provide a coupling which may be put into axial compression by hand rotation of the coupling body relative to its mate without the need for an excessive radial or axial force.

It is another object of the present invention to provide a coupling which, when mated and the coupling is over-pressured to the leak point, the seal will reseat itself in the coupling body to form a fluid-tight seal with its mate when the pressure is reduced.

It is a feature of the present invention to provide a coupling which can form a fluid-tight seal with its mate even under low pressure conditions.

It is another feature of the present invention to provide a coupling wherein the seal will not extrude between the coupling bodies when the coupling is over-pressured to bind the coupling and prevent its disengagement.

It is an advantage of the present invention to provide a coupling wherein the annular face seal may be easily removed and replaced within its retaining groove.

It is another advantage of the present invention to provide a coupling and seal combination which has minimal voids where bacteria may grow and thereby be acceptable for use in the food industry.

These and other objects, features and advantages of the present invention will become apparent from the following detailed description wherein references are made to the accompanying drawings.

DETAILED DESCRIPTION

Figure 1:
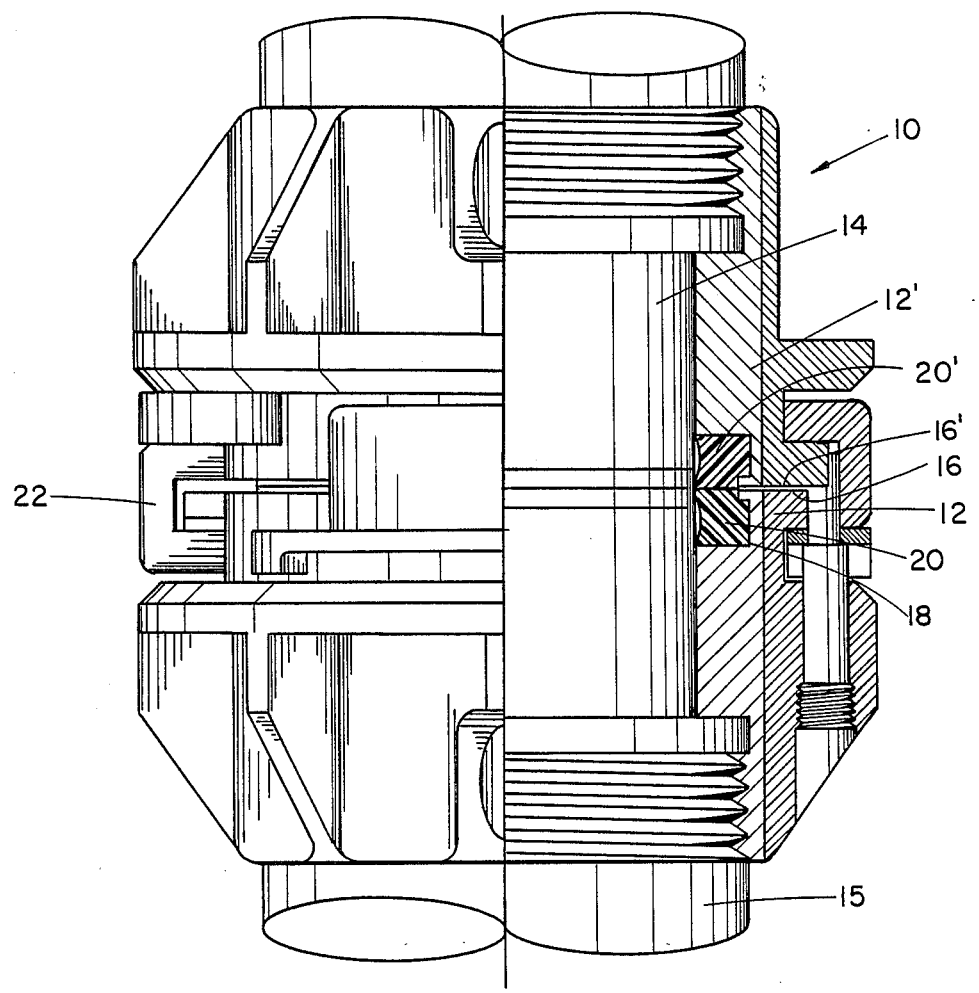
FIG. 1 is a half-sectional view of a coupling according to the present invention.

Referring to FIG. 1, there may be seen a coupling (10) of the present invention attached to a fluid line (15) and having a pair of coupling bodies (12,12') co-aligned along a central longitudinal axis and in mating engagement. It is a feature of the present invention to provide a coupling which may be joined together and made fluid-tight by hand make-up. Although the coupling locking member illustrated in FIG. 1 is of the type described in more detail in U.S. Pat. No. 4,643,459 to Carson, which is hereby incorporated by reference, it is understood that the present invention may be used with any hand-tightened, face-sealing coupling.

The components which comprise the coupling include integral one-piece coupling bodies (12,12'), each manufactured of aluminum, stainless steel or other conventional material well-known in the machine tool and fabricating trades. Each body defines a generally cylindrical bore (14) therethrough as shown in FIG. 1. As described in more detail later, the sealing end or face (6) of each body (12) has formed therein an annular recess (18) having a generally L-shaped cross-sectional configuration with an elastomeric annular seal (20) comprised of a suitable sealing material adapted to the particular application for which the coupling is intended, disposed in the recess (18). An elastomer having a durometer hardness of approximately 70 has been found particularly desirable.

Further, each coupling body (12) will preferably be provided with at least one locking member (22). The locking member (22) should secure the faces (16,16') of the coupling bodies together using axial or rotational force. Appropriate locking mechanisms, aside from the one illustrated, include threaded connectors, inclined slides, cam action levers and other locking members well known in the art.

When the coupling bodies are axially compressed together, the annular seal (20,20') adjacent each face (16,16') of the coupling body (12,12') is in mating contact with its counterpart, and a fluid-tight seal is formed. Axial compression thus energizes the elastomer so that a low pressure seal is established.

It may be seen that the amount of rotational force required to mate the coupling bodies together is related to the axial force required to compress the seal. If an annular seal sufficient to hold high pressure had a cross-sectional square or circular configuration, a large axial force would be required to force the seal faces together. This in turn would make the coupling bodies extremely difficult to join together manually. For this reason, it is desirable to have a seal which forms a low pressure, fluid-tight seal under mild axial force yet can still maintain fluid at higher pressures.

Figure 2:
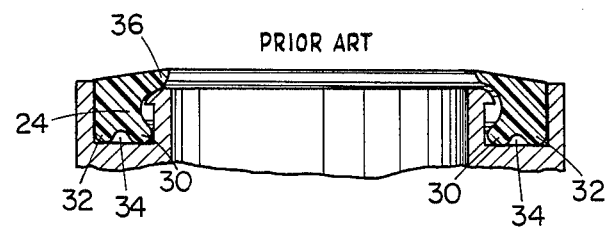
FIG. 2 is a cross-sectional view of a prior art elastomeric face seal in a groove of a coupling body.

Referring now to FIG. 2, there may be seen a cross-sectional view of an elastomeric face seal (24) used in manual couplings of the prior art. It may be seen that the prior art seal (24) rests within a recess (26) and is held in place by a wall having a retaining hook (28) radially inward of the seal (24). A semi-circular toe (30) and heel (32), with a seal groove (34) in between, form the base of the annular seal. This toe and heel are folded together along the seal groove for placement within the recess to expand when released, thereby being secured beneath the retaining hook.

A relatively thin lip (36) extends over the retaining hook end radially inward and axially away from the retaining hook at an angle of approximately 9° from the radial plane. When a coupling of this prior art configuration is placed in axial compression with its mate, this thin lip is bent downward and a low pressure seal is formed. Under greater axial compression, the lip may be supported by the top of the retaining hook.

Figures 3, 4:
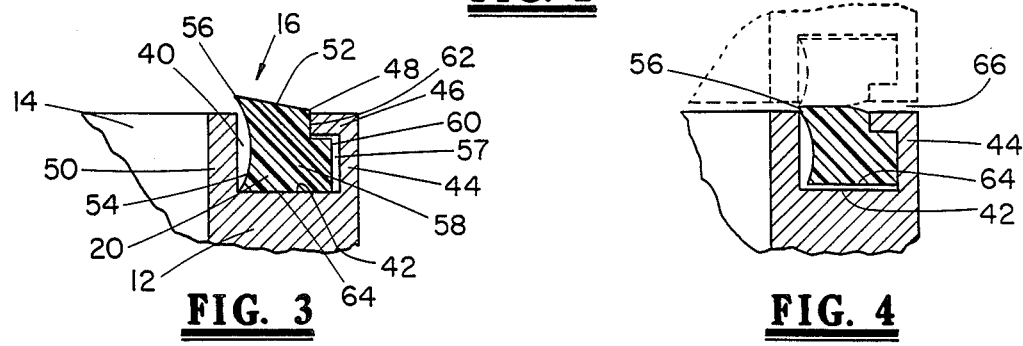
FIG. 3 is a cross-sectional view of an elastomeric seal according to the present invention in a groove of a coupling body when not subjected to line pressure.
FIG. 4 is a cross-sectional view of a seal according to the present invention in a groove of a coupling body when subjected to high line pressure.

Referring now to FIG. 3, there may be seen a more detailed cross-sectional view of an elastomeric seal according to the present invention as it resides in a recess of a coupling body when not subjected to line pressure. The coupling of the present invention may be comprised of several components, a coupling body (12) having an annular recess (40) defined by a recess base surface (42) and an outer wall (44), a locking member (22) for securing coupling bodies together, and an annular securing member (46) extending radially inward from the outer wall and having an end surface (48) for compressive engagement with an annular seal (20). An optional seal guard (50) may be placed radially inward from the seal to protect the seal from being snagged if a plug is used to clean the bore. In instances where a cleaning plug is not anticipated, the seal guard may be eliminated.

The annular seal (20) is configured to fit within this annular recess (40) and has a tapered upper surface (52) projecting radially inward and axially away from its respective coupling body at an angle of 13° to 17° from the radial plane. A concave surface (54) is formed radially inward from the seal and intersects the upper surface (52) such that a seal edge (56) is formed axially above the annular securing member (46). A radially outward seal projection (58), axially between the securing member (46) and the recess base surface (42) of the coupler, serves to hold the annular seal within the annular recess (40).

It should be noted that at rest the seal projection (58) does not extend all the way to the outer wall (44) but an expansion space (60) is left between the projection (58) and the outer wall (44). A space of 0.01–0.03 inches between the seal projection surface (58) and the outer wall has been found adequate. Further it is desirable to provide a small tolerance gap (57) of 0.005"to 0.007" between the bottom of the securing member and the top of the seal projection.

In contrast to the expansion space, the compression surface (48) of the annular securing member has a diameter sufficient to place the annular seal in compression at seal compression surface (62). This serves both to secure the annular seal and place the seal in partial compression to improve the low-pressure sealing characteristics. It may be convenient to have the corner formed by the upper surface (52) and the compression surface (62) to extend axially above the top of the securing member a few thousandths of an inch to permit additional space between the mated coupling bodies. The concave surface (54) has a selected radius of curvature which is a function of the height of the annular seal from the seal base surface (64) to edge (56).

Referring now to FIG. 4, there may be seen a cross-sectional view of a seal of the present invention in an annular recess of a coupling body when subjected to high line pressure. The tapered upper surface (52) of each seal is in axial compression and a fluid-tight seal is formed. Because the fluid pressure is high, the annular seal (20) is in compression from all directions. It should be particularly noted that the seal base surface (64) is no longer in contact with the recess base surface (42) and the annular seal (20) has been so deformed and compressed that the expansion space (60) between the seal projection (58), and the outer wall (44) has now been filled.

It is understood that when the seal is in compression, the elastomeric material should be allowed space to deform. If the space between the projection and the outer wall were absent, the elastomer would have a greater tendency to flow out of the annular recess and continue to extrude from the gap (66) between the coupling bodies. This space (60) permits the elastomer to deform as the seal base surface (64) separates from the recess base surface (42) without leaving the confines of the annular recess. Because of the location of the deformation, the seal is pressed even harder against the securing member and the seal does not roll out of the recess.

As the pressure increases to above the maximum recommended for a seal of this nature, the gap (66) between the coupling bodies increases and the edge (56), which normally projects radially inward, folds back upon itself. The elastomeric material begins to extrude or creep slightly from the recess (40) into the gap (66), a portion of the seal protrudes radially outward of the annular recess, and the seal begins to leak. Accordingly, in this configuration the elastomeric material is highly distorted and under great compressive forces, but these forces act merely to change the shape of the seal and not to dislodge the seal from the annular recess.

When the pressure in the bore (14) is reduced to rated limits, the excessive compressive forces on the seal are partially relieved, the seal returns to its original shape, and a fluid-tight seal is again formed. Because of the high distortion that the elastomer has undergone, the seal is damaged and weakened and should be replaced. In one test, the seal which failed and leaked profusely at 2600 psig., resealed itself when the pressure was reduced to 2400 psig. and held for at least 10 minutes.

This safety factor prevents catastrophic failure of the seal and allows sufficient time to safely depressurize the coupling and replace the seal. Further, because the seal returns to its original position, the locking mechanism, which held the coupling bodies in axial compression, could be easily parted.

Referring again to the concave surface [54] shown in FIGS. 3 and 4, it may be seen that the radius of curvature of this surface has a center point radially inward and preferably at the axial midpoint between the seal base surface (64) and seal edge (56). It has been found convenient to allow a small tolerance gap (57) between the bottom of the securing member (46) and the top portion of the seal projection (58) to permit subtle axial movement of the seal within the annular recess. This facilitates ease of installation of the seal within the securing member and provides additional space for the seal to deform when under high pressure.

As the diameter of the coupling increases and the thickness of the seal increases, it has been found particularly beneficial to maintain a compression factor of approximately 80–92%. Compression factor is the ratio between the radius of curvature of the concave surface and the height of the seal from edge to base. As the seal becomes larger and therefore more difficult to compress by hand, the curvature of the concave surface becomes subtly more shallow and the thickness of edge (56) remains substantially constant. In this way different seal sizes require a constant axial compression to be energized and the amount of rotational force required to put the end faces of the coupling bodies in low pressure sealing engagement remains substantially constant. The "feel" of the coupling may be adjusted using this compression factor. If the seal is too "stiff", it will be harder to operate and may not seal well at low pressures. If the seal is too "soft", it may not seal as well at higher pressures. A lower compression factor stiffens the seal and a higher factor softens the seal. The desired feature of a hand-tight, quick-connect coupling is maintained through all conventional sizes.

Dimensions found convenient for conventional nominal size couplings with a seal taper of 15° are set forth in Table 1.

TABLE 1

| Nominal Size (in.) | Height (in.) | Radius of Curvature (in.) | Compression Factor (%) |
| --- | --- | --- | --- |
| 1" | .287 | .25 | 87 |

TABLE 1-continued

| Nominal Size (in.) | Height (in.) | Radius of Curvature (in.) | Compression Factor (%) |
| --- | --- | --- | --- |
| 1¼" | .287 | .25 | 87 |
| 1½" | .287 | .25 | 87 |
| 2" | .287 | .25 | 87 |
| 2½" | .312 | .25 | 80 |
| 3" | .362 | .3125 | 86 |
| 4" | .362 | .3125 | 86 |
| 5" | .407 | .375 | 92 |

It is, therefore, apparent that the present invention is one well adapted to obtain all of the advantages and features set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory, and the invention admits of various changes in the size, shape and material composition of its components, as well as in the details of the illustrated construction, without departing from its scope and spirit.

What is claimed is:

1. A coupling including a pair of coupling bodies each adapted for sealing engagement with respective ends of a fluid line at an axially outward end of the coupling body and having a central passageway for fluid-tight tight transmission of fluid between and mated coupling bodies, the coupling further including locking means to secure the coupling bodies axially together in a coupled position and for releasing the coupling bodies to an axially separated uncoupled position, and an elastomeric annular seal housed in a sealing end of each coupling body for sealing engagement with its respective coupling body and with the other seal when the coupling bodies are mated together, the coupling further comprising:

each coupling body having an annular recess in the sealing end of each coupling body defined by a recess base surface of the coupling body, an outer wall portion of the coupling body, and an open end;

an annular securing member extending radially inward from the outer wall portion of the coupling body and having an end surface for engagement with the annular seal; and the annular seal having a preselected thickness and being configured to fit within the annular recess, and having a cross-sectional configuration which defines:

(a) a tapered upper surface projecting radially inward and axially from its respective coupling body at an angle of from 13° to 17° with respect to a radial planar surface for sealing engagement with the tapered upper surface of the other seal when the coupling is mated;

(b) a radially inward concave surface having a selected radius of curvature with its center positioned radially inward thereof and having a ratio between the radius of curvature and the thickness of the annular seal which establishes a compression factor of 80–92%; and (c) a radially outward projection positioned adjacent the outer wall portion and axially between the securing member and the base surface of the coupling body.

2. The coupling as defined in claim 1, wherein:

an annular seal is formed from a material having a hardness of approximately 70 durometer; and the tapered upper surface of the annular seal being tapered at an angle of approximately 15°.

3. The coupling as defined in claim 1, wherein the outer diameter of the radially outward projection of the annular seal is less than the inner diameter of the outer wall portion of the coupling body such that the annular seal can move radially within the body.

4. The coupling as defined in claim 1, wherein the axial thickness of the radially outward portion of the annular seal is less than the axial spacing between the securing member and the base surface of the coupling body such that the seal can move axially with respect to the coupling body.

5. The coupling as defined in claim 1, wherein the seal is continually compressed radially between the outer wall portion and the end surface of the annular securing member.

6. The coupling as defined in claim 1, wherein the seal has a radially planar base.

7. The coupling as defined in claim 1, wherein the radially outward projection has an upper radially planar stop surface for engagement with a corresponding lower radially planar stop surface on the securing member.

8. The coupling as defined in claim 1, wherein the center of the radius of curvature for the radially inward surface of the seal is substantially at the axial center of the seal.

* * * * *